United States Patent [19]
Lee

[11] Patent Number: 6,129,633
[45] Date of Patent: *Oct. 10, 2000

[54] GAME APPARATUS FOR TELEVISION AND METHOD OF DISPLAYING GAME IMAGES

[75] Inventor: Jae Kyung Lee, Seoul, Rep. of Korea

[73] Assignee: LG Electronics, Inc., Rep. of Korea

[*] Notice: This patent is subject to a terminal disclaimer.

[21] Appl. No.: 08/932,590

[22] Filed: Sep. 17, 1997

Related U.S. Application Data

[63] Continuation of application No. 08/508,074, Jul. 27, 1995.

[30] Foreign Application Priority Data

Jul. 30, 1994 [KR] Rep. of Korea ................... 94-18922

[51] Int. Cl.[7] .................................................. A63F 13/00
[52] U.S. Cl. .................................................. 463/31
[58] Field of Search ..................... 345/418, 302, 345/114; 463/1, 3, 31

[56] References Cited

U.S. PATENT DOCUMENTS 4,026,555 5/1977 Kirschner et al. ................. 463/3
5,844,552 12/1998 Gaughan et al. ................. 345/327
5,855,512 1/1999 Aoyama et al. ................. 463/1

Primary Examiner—Valencia Martin-Wallace
Assistant Examiner—John Paradiso
Attorney, Agent, or Firm—Long Aldridge & Norman

[57] ABSTRACT

An improved game apparatus for a television and a control method thereof capable of playing a game using a remote controller and an OSD, which includes an operating unit for setting a certain mode and starting a game; an input/output controller for receiving the output signal of the operating unit; a game-exclusive ROM for outputting a game program in accordance with an output signal of the input/output controller; a game-exclusion RAM for storing a currently playing game state; an on-screen controller for outputting original color signals of an on-screen display so as to display a game state; a tuner for receiving a combined picture signal transferred from an antenna; a picture signal processing unit for receiving a combined picture signal outputted from the tuner and for outputting television picture original color signals; a first switch for outputting selectively outputting the original color signals of an on-screen display outputted from the on-screen controller and television picture original signals outputted from the picture processing unit in accordance with a control signal of a microprocessor, and a picture controller for displaying the original color signals outputted from the first switch on a screen of a television.

41 Claims, 9 Drawing Sheets

GAME APPARATUS FOR TELEVISION AND METHOD OF DISPLAYING GAME IMAGES

This is a continuation of application Ser. No. 08/508,074 filed on Jul. 27, 1995.

BACKGROUND OF THE INVENTION

1. Field of the Invention

The present invention relates to a game apparatus for a television and a control method thereof, and in particular to an improved game apparatus for a television and a control method thereof capable of playing a game using a remote controller and an on-screen display (hereinafter called the "OSD").

2. Description of the Conventional Art

Referring to FIG. 1, a conventional game apparatus for a television includes a control panel 1 for selecting a certain game mode, a controller 2 for controlling the entire control operation of the game apparatus in accordance with an output signal of the control panel 1, a memory unit 3 for outputting an original red, green, and blue colors R, G, and B in accordance with an enable signal and address signals R, G, and B outputted from the controller 2, a frame buffer 4 for temporarily storing the original color signals R, G, and B outputted from the memory 3 in accordance with a clock signal of the controller 2, a digital/analog (D/A) converter 5 for converting the original color signals R, G, and B outputted from the frame buffer 4 in accordance with a clock signal of the controller 2, an adder 6 for adding the analog original color signals R, G, and B outputted from the D/A converter 5 to a certain ratio and for computing a brightness signal Y, a subtractor 7 for subtracting the brightness signal Y outputted from the adder 6 from the analog original signals R, G, and B outputted from the D/A converter 5 and for computing the differential color signals R-Y and B-Y, a first amplifier 8 for amplifying the brightness signal Y outputted from the adder 6 to a predetermined level, a second amplifier 9 for amplifying the differential color signals R-Y and B-Y outputted from the subtractor 7 to a predetermined level, a third amplifier 10 for amplifying a synchronous signal outputted from the controller 2 to a predetermined level, and a combined picture signal processing unit 11 for combining the brightness signal Y outputted from the first amplifier 8, the differential signals R-Y and B-Y outputted from the second amplifier 9, and the synchronous signal outputted from the third amplifier 10 and for outputting the combined signals to a television monitor.

The operation of the conventional game apparatus for a television will now be explained.

To begin with, when a user selects a certain game key from the control panel 1, the controller 2 outputs the address signals R, G, and B and an enable signal Es to the memory 3 and outputs a clock signal to the frame buffer 4 and the D/A converter 5, and outputs a synchronous signal to the third amplifier 10.

Thereafter, the memory 3 is enabled by an enabled signal Es outputted from the controller 2 and outputs the original color signals R, G, and B of the game data designated by the address signals R, G, and B outputted from the controller 2 and temporarily stores the original color signal R, G, and B into the frame buffer 4, and the frame buffer 4 outputs the original color signals R, G, and B of the game data to the D/A converter 5 in accordance with a clock signal of the controller 2.

Thereafter, the D/A converter 5 converts the original color signals R, G, and B of the game data into analog original color signals R, G, and B, and the adder 6 adds the analog original color signals R, G, and B outputted from the D/A converter 5 to be color signals having proper combination ratio. For example, the color signal has the combination ratio of a green color signal 59%, a red color signal 30%, and a blue color signal 11%. Thereafter, the D/A converter 5 outputs a brightness signal Y to the first amplifier 8 and the subtractor 7.

In addition, in a color television, differential color signals R-Y, G-Y, and B-Y obtained by subtracting the brightness signal Y from the original color signals R, G, and B is generally used as a color transmission signal. However, in a national television system committee type, the differential signal G-Y can be obtained by adapting two kinds of differential signals R-Y and B-Y at a receiving side, so two differential color signals R-Y and B-Y among three differential color signals R-Y, G-Y, and B-Y are used as a color transmission signal.

Therefore, the subtractor 7 subtracts the brightness signal Y outputted from the adder 6 from the analog original color signals R, G, and B outputted from the D/A converter 5 and outputs the differential signals R-Y and B-Y to the second amplifier 9.

In addition, the brightness signal Y outputted from the adder 6, the differential color signals R-Y and B-Y outputted from the subtractor 7, and synchronous signal outputted from the controller 2 are amplified by the first amplifier 8, the second amplifier 9, and the third amplifier 10, respectively, and the amplified signals are inputted into the combined picture signal processing unit 11.

Therefore, the picture signal processing unit 11 receives the brightness signal Y, the differential color signals R-Y and B-Y, and the synchronous signal each outputted from the first amplifier 8, the second amplifier 9, and the third amplifier 8, respectively, and outputs the combined picture signals to the television monitor.

However, in case of connecting the conventional game apparatus to a television, a user can not enjoy better resolution of the television because combined picture signals outputted from the game apparatus are disadvantageously transferred to the television. In addition, because a remote controller is connected to the television closely, the eyesight of a user can be hurt. Moreover, if the user wants another game program, the user has to change the current game pack with a new one, so it is inconvenient to play with the conventional game apparatus.

SUMMARY OF THE INVENTION

Accordingly, it is an object of the present invention to provide a game apparatus for a television and a control method thereof, which overcome the problems encountered in a conventional game apparatus for a television and a control method thereof.

It is another object of the present invention to provide an improved game apparatus for a television and a control method thereof capable of playing a game using a remote controller and an OSD.

To achieve the above objects, there is provided a game apparatus for a television, which includes an operating unit for setting a certain mode and starting a game; an input/output controller for receiving the output signal of the operating unit; a game-exclusive ROM for outputting a game program in accordance with an output signal of the input/output controller, a game-exclusive RAM for storing a currently playing game state; an on-screen controller for outputting original color signals of an on-screen display so as to display a game state; a tuner for receiving a combined picture signal transferred from an antenna; a picture signal processing unit for receiving a combined picture signal outputted from the tuner and for outputting television picture original color signals; a first switch for outputting selectively outputting the original color signals of an on-screen display outputted from the on-screen controller and television picture original signals outputted from the picture processing unit in accordance with a control signal of a microprocessor, and a picture controller for displaying the original color signals outputted from the first switch on a screen of a television.

To achieve the above objects, there is provided a game apparatus for a television, which further includes an operating unit for selecting a game mode or a television mode by operating a remote controller or a key mattrix; a receiver for receiving a mode selection signal outputted from the remote controller of the operating unit; a microprocessor for performing an entire control operation of the apparatus in accordance with a mode selection signal outputted from a receiver and the key mattrix; a game processing unit for controlling a game in accordance with a game control signal of the microprocessor in a game mode; an on-screen display controller for receiving an on-screen data outputted from the microprocessor and a game picture on-screen data outputted from the game processing unit and for outputting original color signals and a fast blank signal; a switch for selectively outputting television picture original color signals outputted from an externally connected element and original color signals of a game on-screen display in accordance with a fast blank signal outputted from the on-screen controller; and a picture controller for displaying original color signals outputted from the third switch on the screen of a television in accordance with a picture control-signal of the microprocessor.

To achieve the above objects, there is further provided a game apparatus control method for a television, which includes the steps of a first step which checks whether the current mode is a game mode when a game control key is inputted; a second step which initializes a register of a game-exclusive RAM and turns on a game mode and outputs a game on-screen display when the current mode is not the game mode at the first step; and a third step which starts a game in accordance with a program of a game-exclusive ROM when the current mode is a game mode in a state that a game control key is not inputted at the first step and starts the present television operation in case that the current mode is not the game mode.

DETAILED DESCRIPTION OF THE INVENTION

Figure 1:
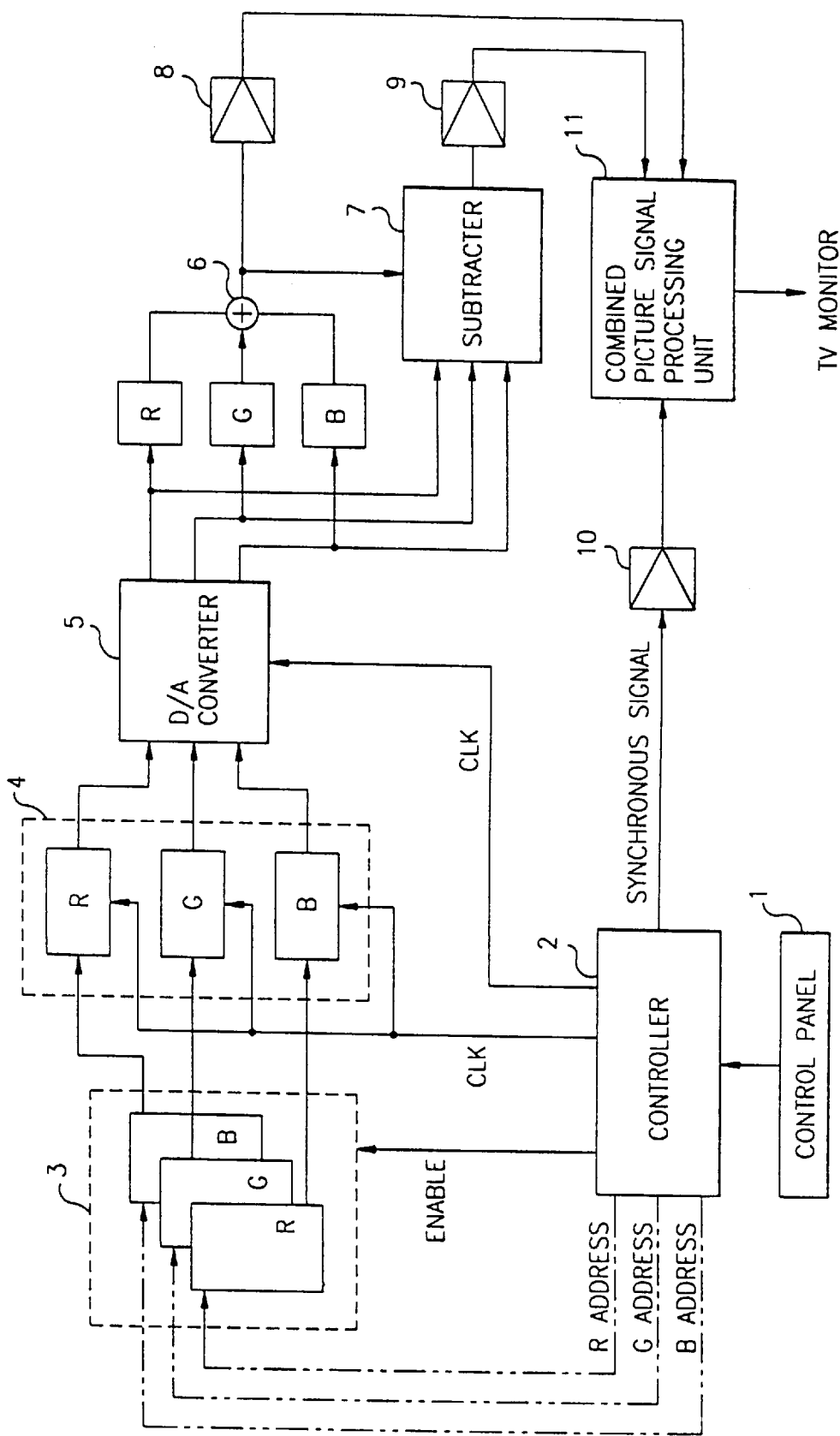
FIG. 1 is a block diagram of a conventional game apparatus for a television.
Figure 2:
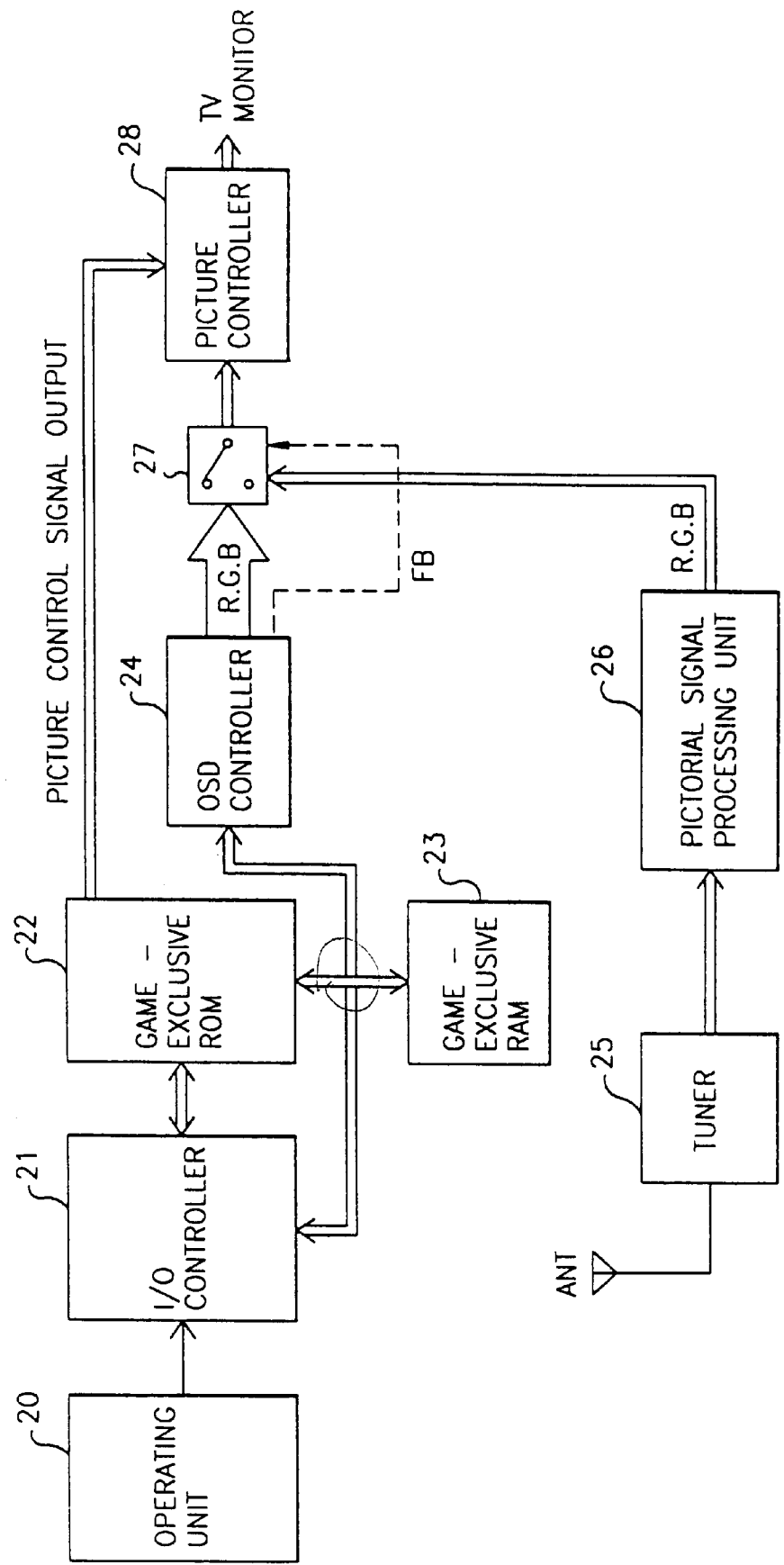
FIG. 2 is a block diagram of a game apparatus for a television according to a first embodiment of the present invention.

Referring to FIG. 2, a game apparatus for a television according to a first embodiment of the present invention includes an operating unit 20 for setting a game mode and a television mode by operating a remote controller or a key matrix, an input/output micro-controller 21 for receiving the output signal of the operating unit 20, a game-exclusive ROM 22 for storing game programs and for outputting a corresponding game program in accordance with an output signal of the micro-controller 21, a game-exclusive RAM 23 for storing a changed game mode, an on-screen display (OSD) control unit 24 for outputting original color signals R, G, and B of a game OSD so that a user can understand what game program is displayed on the monitor, a tuner 25 for receiving a combined picture signal from an antenna, a pictorial signal processing unit 26 for computing the original color signals R, G, and B from the combined picture signals outputted from the tuner 25, a switch 27 for outputting the original color signals R, G, and B outputted from the picture signal processing unit 26 and the OSD controller 24 in accordance with a control signal of a microprocessor, and a picture control unit 28 for controlling the picture of the original color signals R, G, and B outputted from the switch 27 in accordance with a picture control signal outputted from the game-exclusive ROM 22.

The operation of the game apparatus for a television according to a first embodiment of the present invention will now be explained with reference to FIG. 2.

To begin with, when a user selects a certain game key by operating a remote controller or a key matrix, the micro-controller 21 receives the signal outputted from the operating unit 20 and outputs the signal to the game-exclusive ROM 22. And the game-exclusive ROM 22 outputs a corresponding game program to the OSD controller 24 in accordance with a signal outputted from the micro-controller 21 and outputs a picture control signal to the picture controller 28 to control the picture of a playing game.

At this time, the microprocessor checks the current picture, and if the current mode is not a game mode, the microprocessor initializes a register of the game-exclusive RAM and turns on the game mode and switches an operating terminal of the switch to the OSD controller 24.

Figure 10A:
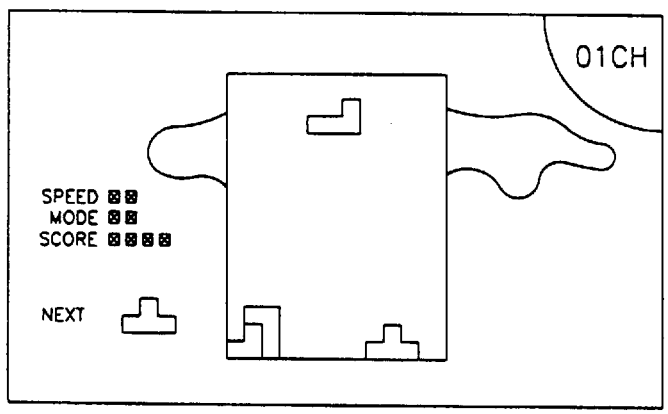
FIG. 10A is a view of an example of a game OSD with a background of a TV broadcast picture displayed on a monitor according to the present invention.
Figure 10B:
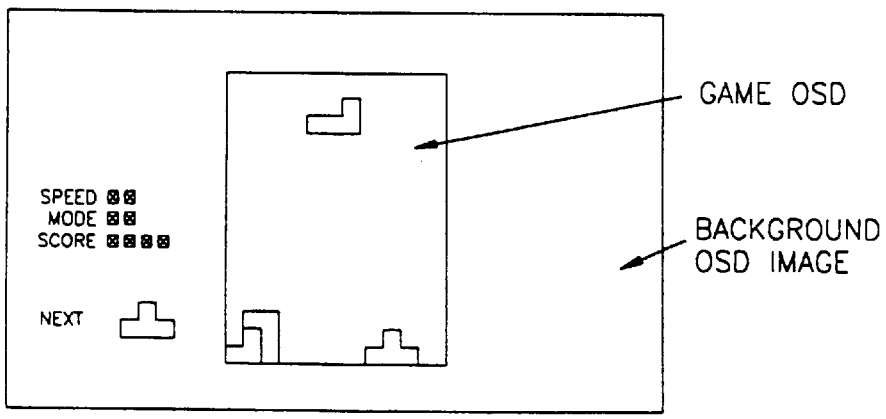
FIG. 10B is a view of an example of a game OSD with a desired color background according to the present invention.

Therefore, the OSD controller 24 receives a game program from the game-exclusive ROM 22 and outputs the original color signals R, G, and B to the picture controller 28 through the switch 27, and the picture controller 28 controls the picture of the original color signals R, G and B of the game OSD outputted from the switch 27 in accordance with a picture control signal outputted from the game-exclusive ROM 22, and the game OSD and its background are displayed on the monitor as shown in FIG. 10B.

In a state that the game OSD is played on the screen, the user selects a desired background from either background original color signals R, G, and B outputted from the OSD controller 24 or the original color signals R, G, and B.

That is, when the user presses the background selection key from the operating unit 20 so as to change the current background, which is automatically selected, to a new one, the microprocessor detects the input of the background selection key and switches the operating terminal of the switch to the pictorial signal processing unit 26.

Therefore, the combined picture signal outputted from the antenna and the tuner is inputted into the pictorial signal processing unit 26, and the pictorial signal processing unit 26 computes the original color signals R, G, and B from the combined picture signals and outputs the computed signals to the picture controller 28 through the switch, and as shown in FIG. 10, the game OSD is displayed on the screen as a background.

Thereafter, the user controls the game OSD on the screen, and the changed picture of the playing game is stored in the game-exclusive RAM 23, so the user can understand the current game state.

Figure 3:
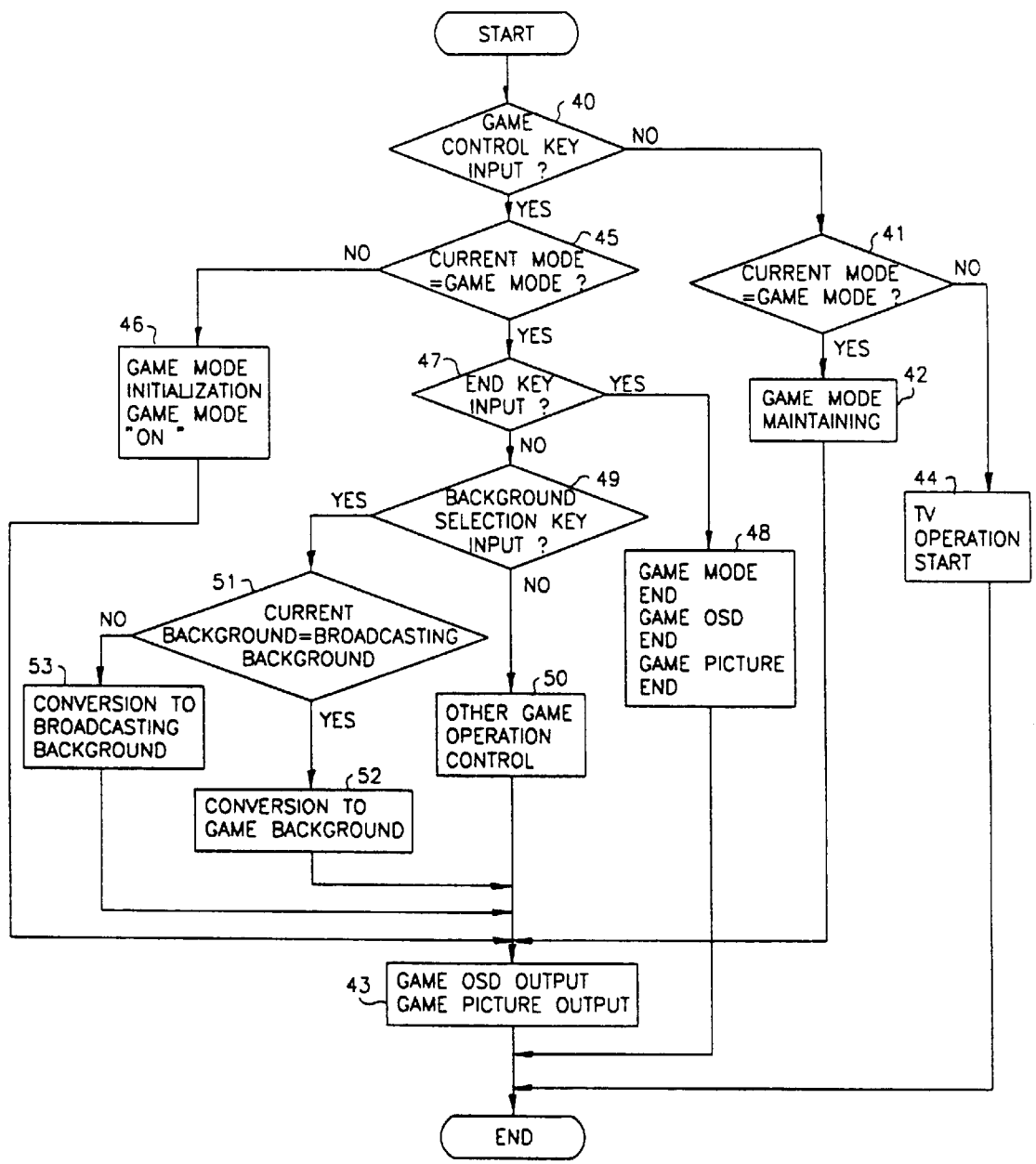
FIG. 3 is a flow chart of a game control method of FIG. 2 according to the present invention.

The control operation of the game apparatus of a television according to the present invention will now be explained with reference to FIGS. 2 and 3.

To begin with, the micro-controller maintains a current game mode if there is not another game mode outputted from the operating unit 20 and displays the game OSD selected by the game program of the game-exclusive ROM 22 (40 through 43 in FIG. 3), and in a state that there is no input signal from the game controller, if the current state is not a game mode, the micro-controller switches the operating terminal of the switch 27 to the picture signal processing unit 26, and then a desired picture is displayed on the screen (44).

In addition, in a state that a game control key is inputted, if there is not a game mode, the micro-controller initializes a register of the game-exclusive RAM 22 for a game mode and turns on the next game mode (46) and controls the switch 27 to display the OSD original color signals R, G, and B on the screen (45 through 46, 43).

Thereafter, in a current game mode after a game control key is inputted, the microprocessor 30 ends the game mode and the game OSD when a game end signal is inputted thereto from the operating unit 20, and the picture output mode is fed back to the beginning mode and the background is changed to a television broadcast signal (47–48), and in case that there is no input signals of the game end and the background selection key, the microprocessor 30 controls the corresponding game operation, and the playing game state and the change mode are displayed on the screen (49–50, 43), respectively.

In addition, if the playing game OSD is a television broadcast background after a background selection key is inputted from the operating unit 20, the micro-controller 30 changes the picture to the background selected by the operating unit 20 (51 through 52), and if the current background is the game OSD background, the picture is changed to the television broadcast signal (53), so the game OSD background is changed (43).

Figure 4:
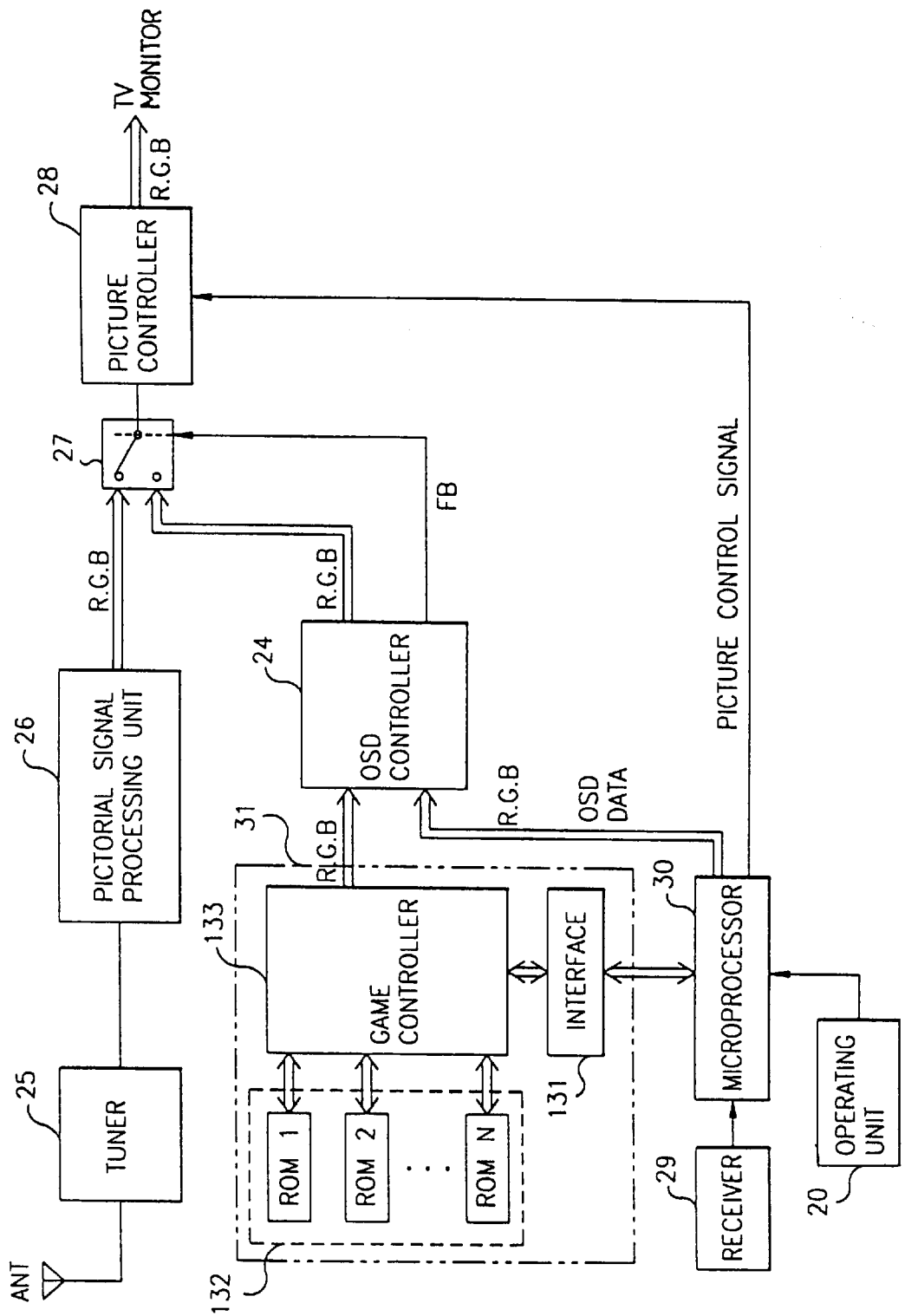
FIG. 4 is a block diagram of a game apparatus for a television according to a second apparatus of the present invention.

Next, a game apparatus for a television and a control method thereof according to a second embodiment of the present invention will now be explained with reference to FIG. 4.

To begin with, the game apparatus for a television includes an operating unit 20 for selecting a game mode and a television mode by operating a remote control 120 or a key matrix, a receiver 29 for receiving a mode selection signal outputted from the remote controller of the operating unit 20, a microprocessor 30 for controlling entire control operations of the apparatus in accordance with a mode selection signal outputted from the key matrix of the receiver 29 and the operating unit 20, a game processing unit 31 for the control operation of a corresponding game in accordance with a game control signal of the microprocessor in a game mode, an OSD controller 24 for outputting original color signals R, G, and B of the game OSD and a fast blank signal FB by receiving the OSD data outputted from the microprocessor 30 and the game picture DATA outputted from the game processing unit 31, a tuner 25 for receiving the combined picture signals transferred from an antenna, a pictorial signal processing unit 26 for computing the original color signals R, G, and B by receiving a combined picture signal outputted from the tuner 25, a switch 27 for selecting the original color signals R, G, and B outputted from the picture signal processing unit 26 and the game OSD original color signals R, G, and B outputted from the OSD controller 24 in accordance with a fast blank signal FB outputted from the OSD controller 24, and a picture controller 28 for displaying the original color signals R, G, and B outputted from the switch 27 in accordance with a picture control of the microprocessor 30.

In addition, the game processing unit 31 includes an interface 131 for transferring the game control signal outputted from the microprocessor 30, a game storing unit 132 having a plurality of game ROMs in which game programs are stored, and a game controller 133 for performing the game control operation and for outputting the game picture OSD data in accordance with a game control signal outputted from the interface 131.

Figure 5:
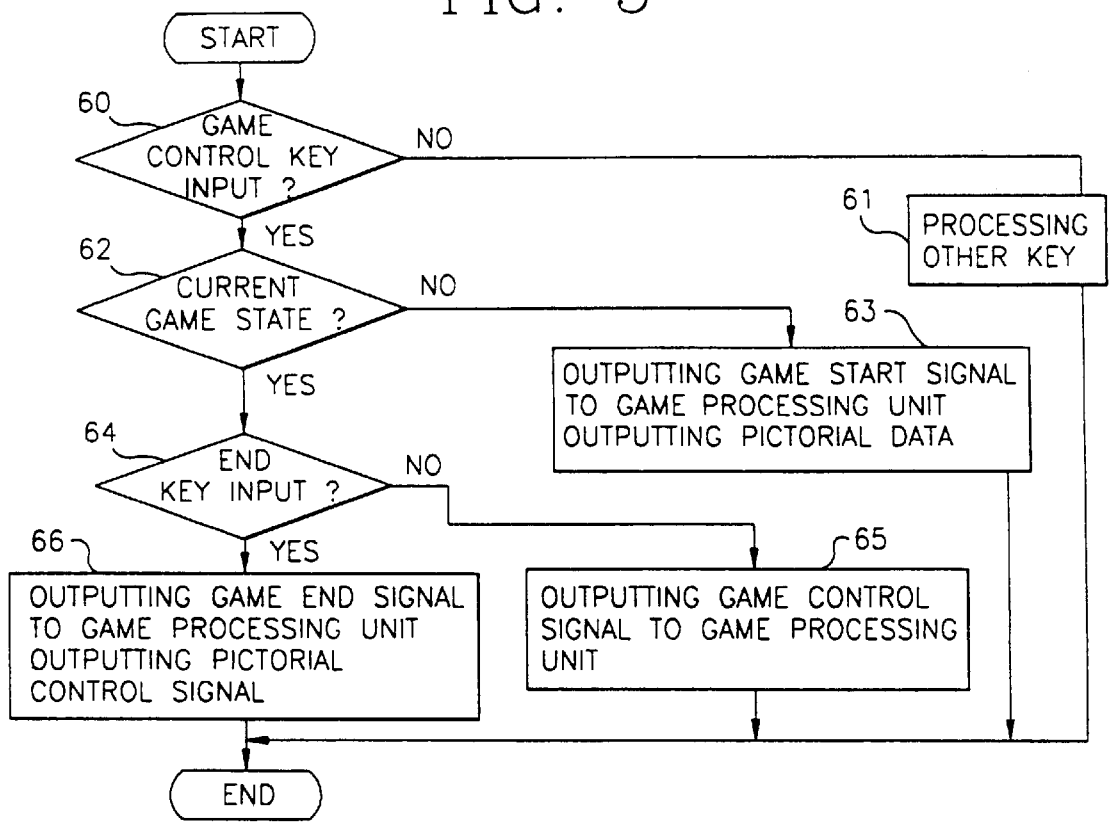
FIG. 5 is a flow chart of a game control method of FIG. 4 according to the present invention.
Figure 6:
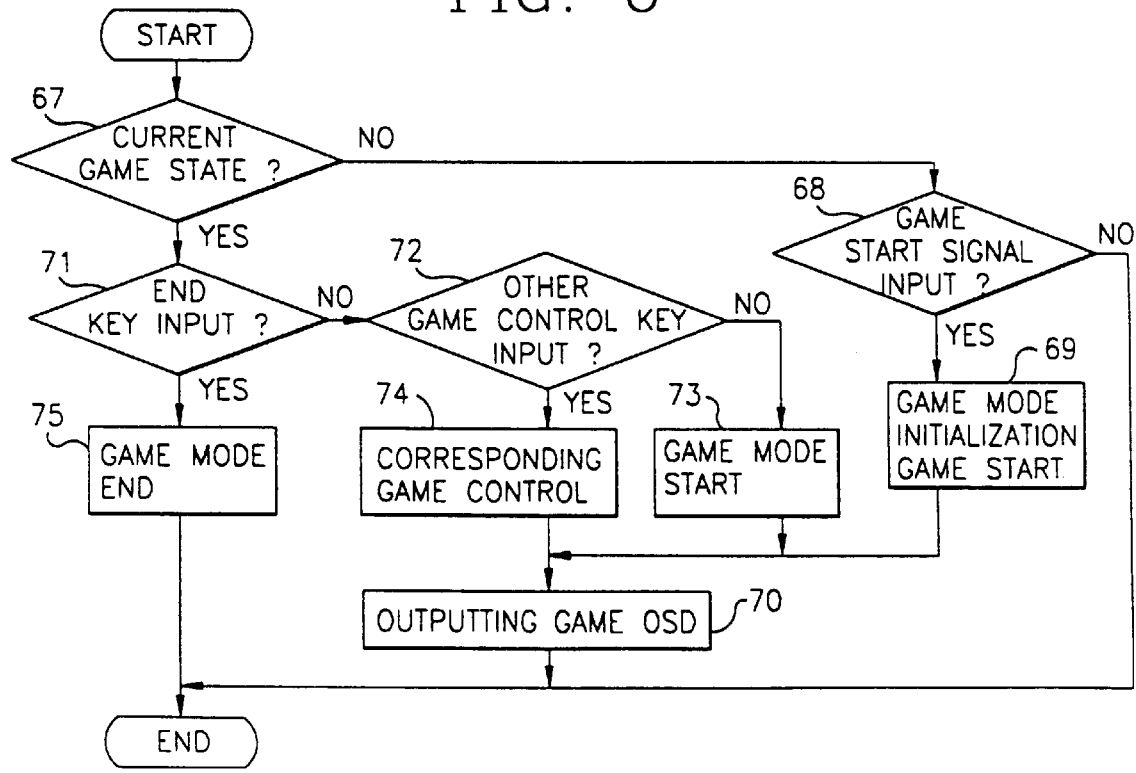
FIG. 6 is a flow chart of a game processing unit of FIG. 4 according to the present invention.

The operation of the game apparatus for a television according to a second embodiment of the present invention will now be explained with reference to FIGS. 4 through 6.

To begin with, when a user selects a desired game key from the operating unit 50, a signal corresponding to the key selection is directly inputted to the microprocessor 52 or is indirectly inputted to the microprocessor through the receiver 52. The microprocessor 52 outputs the game control signal and the OSD data and the picture control signal to the game processing unit 31, the OSD controller 24, and the picture controller, respectively.

Thereafter, the game controller 133 receives a corresponding game from the game storing unit 132 in accordance with a game control signal outputted from the microprocessor 30 and the interface 131 and outputs the game to the game picture OSD data.

Thereafter, the OSD controller 24 receives the OSD data outputted from the microprocessor 52 and the game picture OSD data outputted from the game processing unit 53 and outputs the original color signal R, G, and B of the game OSD and the fast blank signal FB, and the operating terminal of the switch 27 is switched to the OSD controller 21 in accordance with a fast blank signal FB, and the original color signals R, G, and B of the game OSD outputted from the OSD controller 24 are inputted into the picture controller 28.

Therefore, the picture controller 28 controls picture of the original color signals R, G and B outputted from the OSD controller 24 in accordance with a picture control signal outputted from the microprocessor 30 and displays the game picture OSD on the screen of the television.

Meanwhile, when the user selects a television mode from the key input of the operating unit 20, the signal corresponding to the key input is directly inputted into the microprocessor 30 or is indirectly inputted into the microprocessor 30 through the receiver 29, and the microprocessor 30 outputs a picture control signal to the picture controller 28.

In addition, the combined picture signal transferred from the antenna is inputted into the pictorial signal processing unit 26, and the pictorial signal processing unit 26 computes the original color signals R, G, and B from the combined picture signals outputted from the pictorial signal processing unit and outputs the computed signals to the switch 27.

At this time, since the fast blank signal FB is not outputted from the OSD controller 24, the operating terminal of the switch 27 is switched to the pictorial signal processing unit 26, and the original color signals R, G, and B outputted from the pictorial signal processing unit 26 is inputted into the picture controller 28 through the switch 27.

Therefore, the picture controller 28 controls the picture of the original color signals R, G, and B outputted from the pictorial signal processing unit 26 in accordance with a picture control signal outputted from the microprocessor 30 and displays the signals on the screen.

In addition, the control operation of the game apparatus for a television according to a second embodiment of the present invention will now be explained with reference to FIGS. 4 and 5.

To begin with, if a user does not input a game control key into the operating unit 20 and the receiver 29, the microprocessor 30 checks the game state (60 and 61), and in a state that a game control key is inputted, if the current game stat is not present, the microprocessor 30 outputs a game start data to the game processing unit 31 and at the same time outputs the picture control signal to the picture controller 28, and the game OSD is displayed on the screen of the television.

In addition, after a game control key is inputted, when another game key is inputted, the microprocessor 30 outputs a game control signal to the game processing unit 31 (64 and 65), and when the game end key is inputted, the microprocessor 30 outputs the picture control signals corresponding to the game end signal and a television mode to the game processing unit 31 and the picture controller 28, respectively and clears the game OSD and displays a television broadcast picture on the screen of the television (64 and 66).

In addition, the operation of the game processing unit 31 will now be explained with reference to FIG. 6.

To begin with, the game controller 133 receives a game control signal outputted from the microprocessor 30 through the interface 131 and checks whether the current mode is a game mode or not.

As a result, in case that a game mode is not selected, when a game start signal is inputted, the game controller 133 initializes a game mode and performs the selected game in accordance with a game control signal and outputs a game picture OSD data to the OSD controller 24 (67 through 70), and if there is no a game start signal input at the stage 68, the procedure ends.

In addition, in a game mode, if a game end signal and another game control signal is not inputted from the microprocessor 30, the game controller 155 performs a game mode in accordance with a game program (71 through 73) and at the same time outputs the game picture OSD data to the OSD controller 54 (70), and in a game mode, if another game signal is inputted from the microprocessor 30, the game controller 155 controls a corresponding game (74) and outputs the game picture OSD data indicating a game playing mode to the OSD controller 24, and when the game end key is inputted at the stage 71, the game controller 155 ends the game mode (75).

Figure 7:
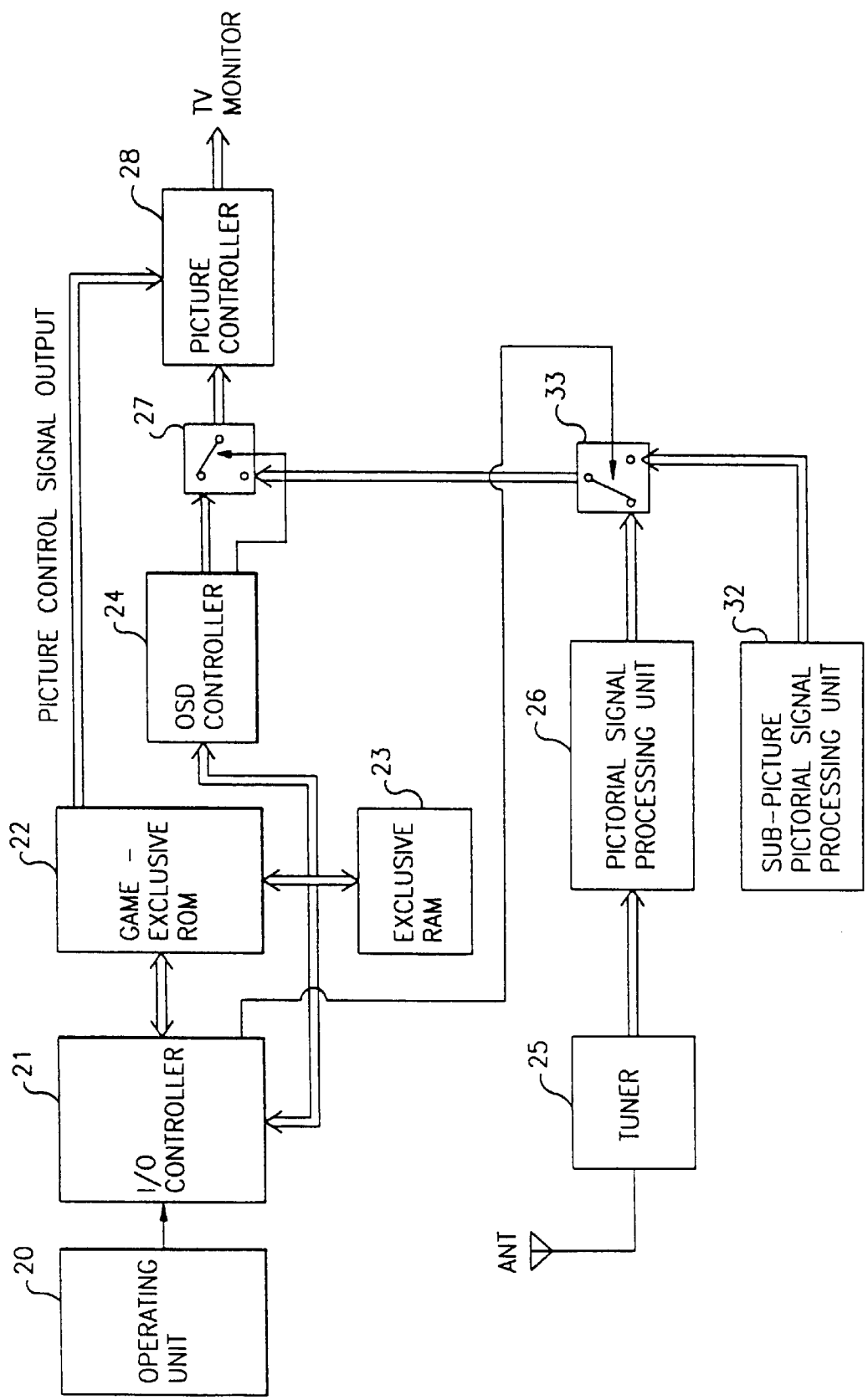
FIG. 7 is a block diagram of a game apparatus for a television according to a third embodiment of the present invention.

The game apparatus for a television and a control method thereof according to a third embodiment of the present invention will now be explained with reference to FIG. 7.

To begin with, the third embodiment includes a sub-main picture signal processing unit and a switch 33 compared with the other embodiments of the present invention, so it can be possible to have a game picture as a main picture and a television broadcast picture as a main-sub picture and on the contrary to have a game picture as a main-sub picture and to have a television broadcast picture as a main picture in accordance with a control signal of the microprocessor 30 and selectively outputs the pictorial signals to be displayed.

Figure 11A:
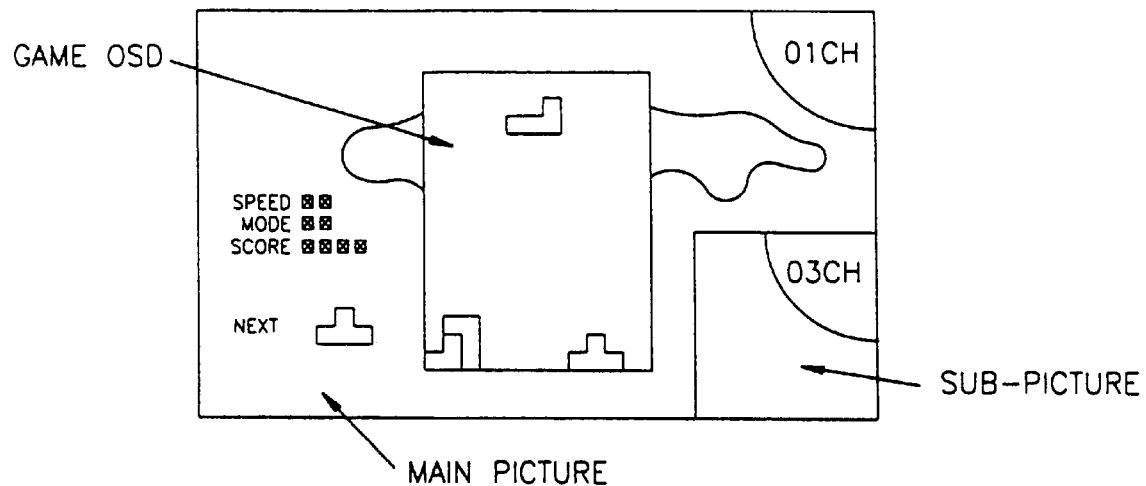
FIG. 11A is a view of an example of a game OSD with a background of a TV broadcast picture on which two small pictures are displayed, of which one picture is from a channel I and another is from a channel III.
Figure 11B:
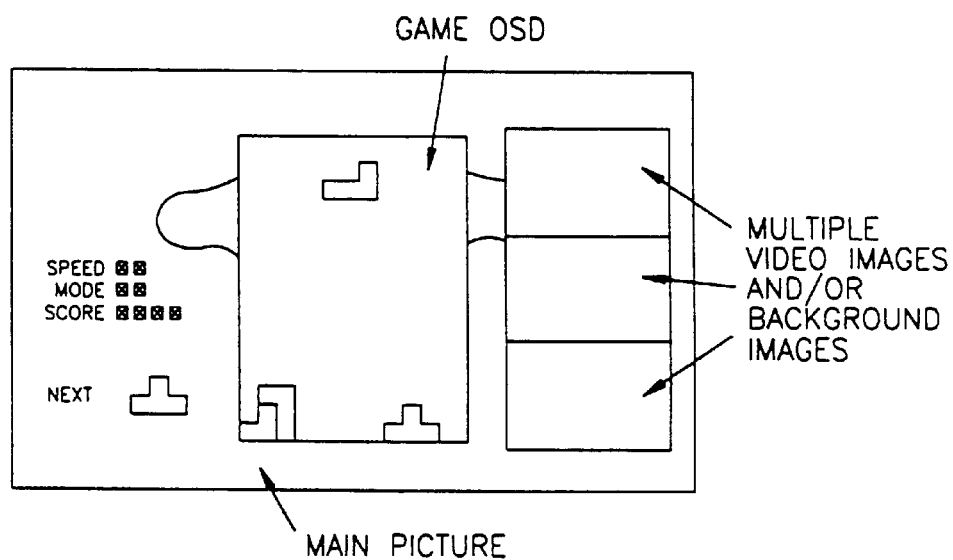
FIG. 11B is a view of an example of a game OSD with a television broadcast picture as a main picture and three other channel's television pictures as three sub-main pictures according to the present invention.

That is, in a game mode that a user displays a game OSD previously set by a game program stored in the game-exclusive ROM 22 by operating a remote controller or a key matrix, when the user presses a background selection key from the operating unit 20, the microprocessor 30 detects the output signal of the operating unit 20 and controls the switch 72. Thereafter, as shown in FIG. 11A, a television broadcast picture is displayed as a main picture with a background picture automatically selected by the game program of the game-exclusive ROM 22. At this time, it is possible to display another sub-main picture from another channel of the television, and as shown in FIG. 11B, it is also possible to display a television broadcast picture as a main picture with three sub-main pictures from another channel of the television.

Figure 8:
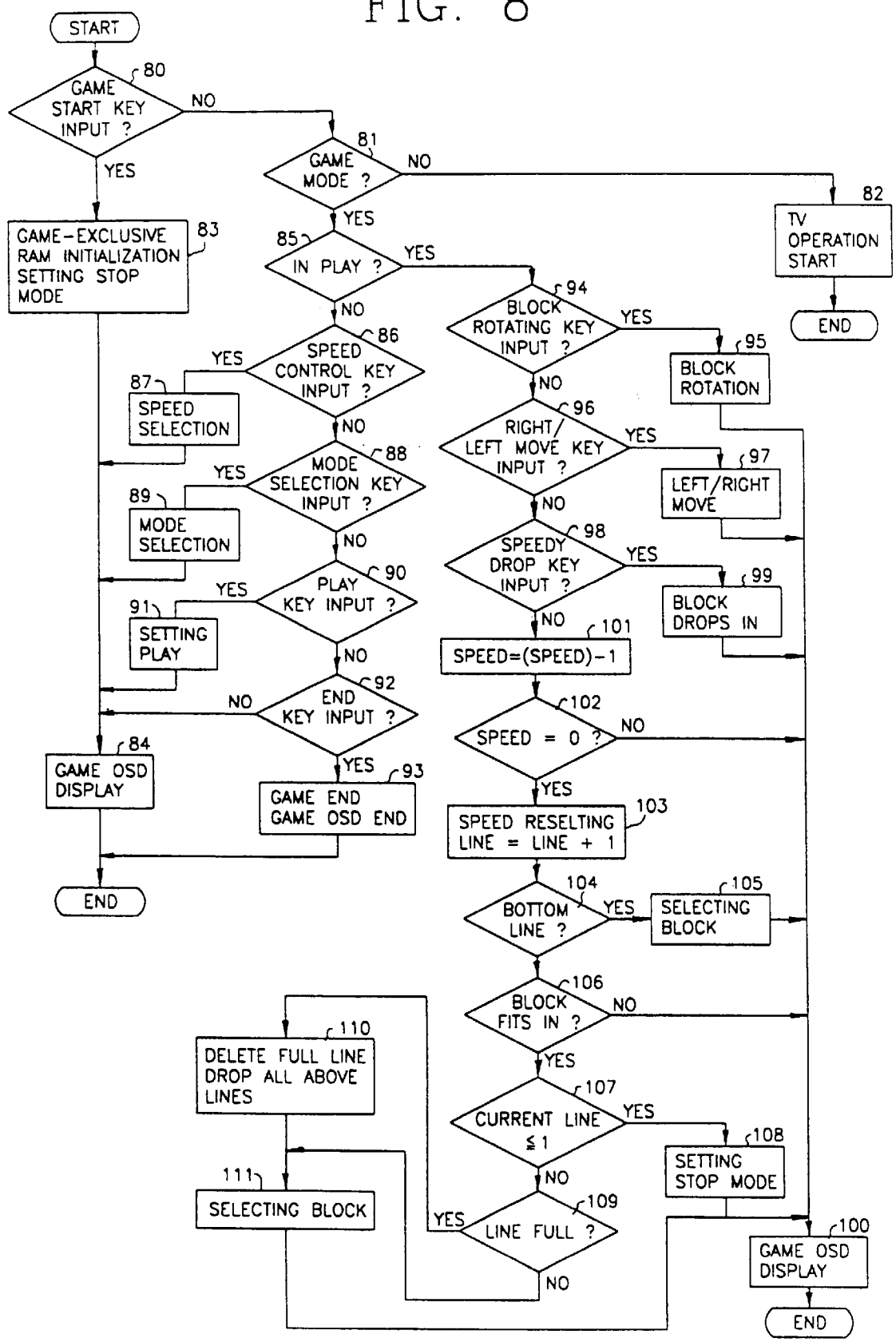
FIG. 8 is a flow chart of a game adapted in the present invention.

For example, the control operation of a game will now be explained with reference to FIG. 8.

To begin with, the micro-controller performs the current television function when a user does not press a game start button (80 through 82).

Figure 9:
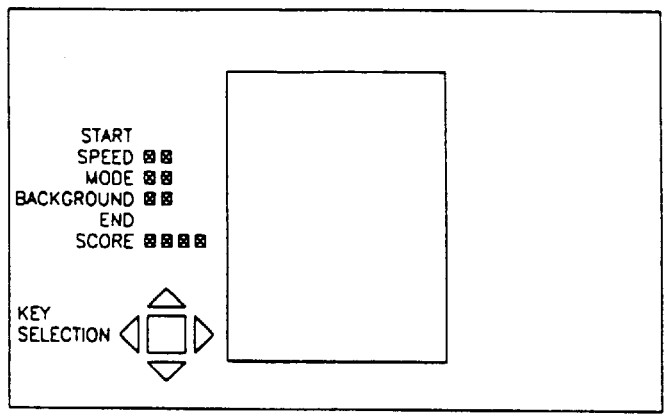
FIG. 9 is a view of an example of a display of a game OSD displayed on a CRT according to the present invention.

In addition, when a user presses a game start button, the microprocessor initializes a register of the game-exclusive RAM 23 and sets the game as a stop mode and switches the operating terminal to the switch 27, so the game data outputted from the game-exclusive ROM 22 is inputted into the OSD controller 24, and the switch 27 and the picture controller 28, and as shown in FIG. 9, a game is displayed on the screen of the television.

In addition, in case that a game start key is inputted and the current game mode does not start, the user selects a speed and mode and set a play state (85 through 91) using a speed control key and a mode selection key and a play key in a state that an end mode is set as shown in FIG. 9.

In addition, at the stage 90, in a state that the user didn't input a certain play key, when a game end key is inputted, the microprocessor ends the game and clears the game OSD (92 through 93), and when a game end key is not inputted, the game OSD is displayed on the screen of the television (89).

In addition, when a play mode is set, blocks drop at a predetermined speed. At this time, a user can rotate the blocks using a block rotating key. If the user wants the blocks to drop at a high speed, the user can control that by pressing a corresponding key (94 through 100).

In addition, at the stage 91, if the user does not press the high speed drop key, the blocks drops at a previously set speed (101 and 102).

In addition, at the stage 102, if the speed of the block drop is 0 (zero), the microprocessor sets a new speed of blocks and increases the line of blocks by one line (102 and 103).

When the blocks arrives at the bottom line, the next block is set and drops (104 and 105). If the next block drops before the previous block arrives at the bottom line, so when blocks comes into contact with each other, the microprocessor ends the game and sets to the stop mode (106 through 108).

However, if there is no block on the first line, the microprocessor checks lines in which there are blocks and deletes the full line and drops all above lines (109 through 111).

As described above, the game apparatus for a television and a control method thereof according to the present invention is directed to provide an internal-type game apparatus for a television capable of using a remote controller and a game OSD for better resolution of a game picture.

What is claimed is:

1. A game apparatus for use with a television, comprising:
    an operating unit for generating at least one instruction;
    a processor for generating at least one command in accordance with said at least one instruction;
    a storage unit for storing at least one game program;
    an on-screen display (OSD) control unit for generating a first display signal that corresponds to said one game program;
    a picture signal processing unit for generating a second display signal that does not correspond to said one game program;
    a first switch for selecting one of said first and second display signals in accordance with said at least one command; and
    a picture control unit for receiving a selected one of the first and second display signals to display a first image represented by said selected one of the first and second display signal;
    wherein said first and second display signals have different resolutions.

2. A game apparatus for use with a television according to claim 1, wherein
    said storage unit comprises means for generating a picture control signal representing a game image, and wherein said picture control unit receives said picture control signal to display said game image and displays said first image as a background image to said game image.

3. A game apparatus for use with a television according to claim 2, wherein said storage unit comprises:
    a removable game-exclusive read only memory (ROM) for storing said at least one game program, said game-exclusive ROM generating said picture control signal to said display control unit; and
    a game-exclusive random access memory (RAM) for storing a current state of said at least one game.

4. A game apparatus for use with a television according to claim 1, wherein at least one of said first and second display signals comprises color signals R, G and B.

5. A game apparatus for use with a television according to claim 1, wherein said first display signal has a higher resolution than said second display signal, said first image having a higher resolution when said first display is selected than when said second display is selected.

6. A game apparatus for use with a television according to claim 1, further comprising a tuner for receiving a picture signal, said picture signal processing unit receiving said picture signal and generating said second display signal in accordance with said picture signal.

7. A game apparatus for use with a television according to claim 1, wherein said picture signal processing unit comprises:
    a main picture signal processing unit for generating a main picture signal representing a main picture image;
    a sub picture signal processing unit for generating at least one sub picture signal representing at least one sub picture image; and
    means for combining said main picture signal and said at least one sub picture signal and generating said second display signal as said combination of said main and sub picture signal.

8. A game apparatus for use with a television according to claim 7, further comprising:
    a first tuner for receiving a main signal, said main picture signal processing unit receiving said main signal and generating said main picture display signal in accordance with said main signal; and
    at least one second tuner for receiving at least one sub signal, said sub picture signal processing unit receiving said at least one sub signal and generating said at least one sub picture display signal in accordance with said at least one sub signal.

9. A game apparatus for use with a television, comprising:
    an operating unit for generating at least one instruction, said operating unit comprising a remote control unit detachable from said game apparatus;
    a processor for generating at least one command in accordance with said at least one instruction;
    a storage unit for storing at least one game program;
    an on-screen display (OSD) control unit for generating a first display signal that corresponds to said game program;
    a picture signal processing unit for generating a second display signal that does not correspond to said game program;
    a switch for selecting one of said first and second display signals in accordance with said control signal; and
    a picture control unit for receiving a selected one of the first and second display signals, and displaying a first image represented by said selected one of the first and second display signals.

10. A game apparatus for use with a television according to claim 9, wherein
    said storage unit comprises means for generating a picture control signal representing a game image, and wherein said picture control unit receives said picture control signal to display said game image and displays said first image as a background image to said game image.

11. A game apparatus for use with a television according to claim 10, wherein said storage unit comprises:
    a removable game-exclusive read only memory (ROM) for storing said at least one game program, said game-exclusive ROM generating said picture control signal to said display control unit; and
    a game-exclusive random access memory (RAM) for storing a current state of said game.

12. A game apparatus for use with a television according to claim 9, wherein at least one of said first and second display signals comprises color signals R, G and B.

13. A game apparatus for use with a television according to claim 9, further comprising a tuner for receiving a picture signal, said picture signal processing unit receiving said picture signal and generating said second display signal in accordance with said picture signal.

14. A game apparatus for use with a television according to claim 9, wherein said picture signal processing unit comprises:

a main picture signal processing unit for generating a main picture signal representing a main picture image;

a sub picture signal processing unit for generating at least one sub picture signal representing at least one sub picture image; and means for combining said main picture signal and said at least one sub picture signal and generating said second display signal as said combination of said main and sub picture signals.

15. A game apparatus for use with a television according to claim 14, further comprising:

a first tuner for receiving a main signal, said main picture signal processing unit receiving said main signal and generating said main picture display signal in accordance with said main signal; and at least one second tuner for receiving at least one sub signal, said sub picture signal processing unit receiving said at least one sub signal and generating said at least one sub picture display signal in accordance with said at least one sub signal.

16. A game apparatus for use with a television, comprising:

an operating unit for generating at least one instruction;

a processor for generating at least one command in accordance with said at least one instruction;

a storage unit for storing a plurality of game programs;

a game controller for selecting a game program from said plurality of game programs in accordance with said at least one command;

an on-screen display (OSD) control unit for generating a first display signal that corresponds to said selected game program;

a picture signal processing unit for generating a second display signal that does not correspond to said selected game program;

a switch for selecting one of said first and second display signals in accordance with said control signal; and a picture control unit for receiving a selected one of the first and second display signals, and displaying a first image that corresponds to said selected one of the first and second display signals.

17. A game apparatus for use with a television according to claim 16, wherein said processor generates a picture control signal representing a game image in accordance with said selected game program, and wherein said picture control unit receives said picture control signal to display said game image and displays said first image as a background image to said game image.

18. A game apparatus for use with a television according to claim 16, wherein said storage unit comprises:

a plurality of removable game-exclusive read only memories (ROM) each of which stores one of said plurality of game programs.

19. A game apparatus for use with a television according to claim 16, further comprises a tuner for receiving a picture signal, said picture signal processing unit receiving said picture signal and generating said second display signal in accordance with said picture signal.

20. A game apparatus for use with a television according to claim 16, wherein said picture signal processing unit comprises:

a main picture signal processing unit for generating a main picture signal representing a main picture image;

a sub picture signal processing unit for generating at least one sub picture signal representing at least one sub picture image; and means for combining said main picture signal and said at least one sub picture signal and generating said second display signal as said combination of said main and sub picture signals.

21. A game apparatus for use with a television according to claim 20, further comprising:

a first tuner for receiving a main signal, said main picture signal processing unit receiving said main signal and generating said main picture display signal in accordance with said main signals; and at least one second tuner for receiving at least one sub signal, said sub picture signal processing unit receiving said at least one sub signal and generating said at least one sub picture display signal in accordance with said at least one sub signal.

22. A game apparatus for use with a television, comprising:

an operating unit for generating at least one instruction, said operating unit comprising a remote control unit detachable from said game apparatus;

a processor for generating at least one command in accordance with said at least one instruction;

a storage unit for storing a plurality of game programs;

a game controller for selecting a game program from said plurality of game programs in accordance with said at least one command;

an on-screen display (OSD) control unit for generating a first display signal that corresponds to said selected game program;

a picture signal processing unit for generating a second display signal that does not correspond to said selected game program;

a switch for selecting one of said first and second display signals in accordance with said at least one command; and a picture control unit for receiving a selected one of the first and second display signals to display an image that corresponds to said selected one of first and second display signals;

wherein said first and second display signals have different resolutions.

23. A method for displaying game images, comprising steps of:

generating at least one instruction;

generating at least one command in accordance with said at least one instruction;

storing at least one game program;

generating a first display signal that corresponds to said one game program;

generating a second display signal that does not correspond to said one game program;

selecting one of said first and second display signals in accordance with said at least one command; and displaying a first image represented by a selected one of the first and second display signals, wherein said first and second display signals have different resolutions.

24. A method for displaying game images according to claim 23, further comprising the step of generating a picture control signal representing a game image, wherein said step for displaying comprises the steps of:
   displaying said game image; and
   displaying said first image as a background image to said game image.

25. A method for displaying game images according to claim 23, wherein at least one of said first and second display signals comprises color signals R, G and B.

26. A method for displaying game images according to claim 23, wherein said first display signal has a higher resolution than said second display signal so that said first image has a higher resolution when said first display is selected than when said second display is selected.

27. A method for displaying game images according to claim 23, further comprising the step of receiving a picture signal, wherein said step of generating said second display signal comprises the step of generating said second display signal in accordance with said picture signal.

28. A method for displaying game images according to claim 23, wherein said step of generating said second display signal comprises the steps of:
   generating a main picture signal representing a main picture image;
   generating at least one sub picture signal representing at least one sub picture image;
   combining said main picture signal and said at least one sub picture signal; and
   generating said second display signal as said combination of said main and sub picture signals.

29. A method for displaying game images according to claim 28, wherein said step of generating said second display signal further comprises the steps of:
   receiving a main signal;
   generating said main picture display signal in accordance with said main signal;
   receiving at least one sub signal; and
   generating said at least one sub picture display signal in accordance with said at least one sub signal.

30. A method for displaying game images, comprising steps of:
   generating at least one instruction with a detachable remote control unit;
   generating at least one command in accordance with said at least one instruction;
   storing at least one game program;
   generating a first display signal that corresponds to said game program;
   generating a second display signal that does not correspond to said game program;
   selecting one of said first and second display signals in accordance with said control signal; and
   displaying a first image represented by a selected one of the first and second display signal.

31. A method for displaying game images according to claim 30, further comprising the step of generating a picture control signal representing a game image,
   wherein said step for displaying comprises the steps of:
      displaying said game image; and
      displaying said first image as a background image to said game image.

32. A method for displaying game images according to claim 30, wherein at least one of said first and second display signals comprises color signals, R, G and B.

33. A method for displaying game images according to claim 30, wherein said first display signal has a higher resolution than said second display signal so that said first image has a higher resolution when said first display is selected than when said second display is selected.

34. A method for displaying game images according to claim 30, further comprising the step of receiving a picture signal, wherein said step of generating said second display signal comprises the step of generating said second display signal in accordance with said picture signal.

35. A method for displaying game images according to claim 30, wherein said step of generating said second display signal comprises the steps of:
   generating a main picture signal representing a main picture image;
   generating at least one sub picture signal representing at least one sub picture image;
   combining said main picture signal and said at least one sub picture signal; and
   generating said second display signal as said combination of said main and sub picture signals.

36. A method for displaying game images according to claim 35, said step of generating said second display signal further comprises the steps of:
   receiving a main signal;
   generating said main picture display signal in accordance with said main signal;
   receiving at least one sub signal; and
   generating said at least one sub picture display signal in accordance with said at least one sub signal.

37. A method for displaying game images, comprising steps of:
   generating at least one instruction;
   generating at least one command in accordance with said at least one instruction;
   storing a plurality of game programs;
   selecting a game program from said plurality of game programs in accordance with said at least one command;
   generating a first display signal that corresponds to said selected game program;
   generating second display signal that does not correspond to said selected game program;
   selecting one of said first and second display signals in accordance with said control signal; and
   displaying a first image that corresponds to a selected one of the first and second display signals.

38. A method for displaying game images according to claim 37, further comprising the step of generating a picture control signal representing a game image in accordance with said selected game program, and
   wherein said step of displaying comprises the steps of:
      displaying said game image; and
      displaying said first image as a background image to said game image.

39. A method for displaying game images according to claim 37, further comprising the step of receiving a picture signal, wherein said step of generating said second display signal comprises the step of generating said second display signal in accordance with said picture signal.

40. A method for displaying game images according to claim 37, wherein said step of generating said second display signal comprises the steps of:
   generating a main picture signal representing a main picture image;

generating at least one sub picture signal representing at least one sub picture image;

combining said main picture signal and said at least one sub picture signal; and generating said second display signal as said combination of said main and sub picture signals.

41. A method for displaying game images according to claim 40, said step of generating said second display signal further comprises the steps of:

receiving a main signal;

generating said main picture display signal in accordance with said main signal;

receiving at least one sub signal; and generating said at least one sub picture display signal in accordance with said at least one sub signal.

* * * * *